G. LANE.
YIELDING DRIVING CONNECTION.
APPLICATION FILED APR. 24, 1912.
1,063,808.
Patented June 3, 1913.
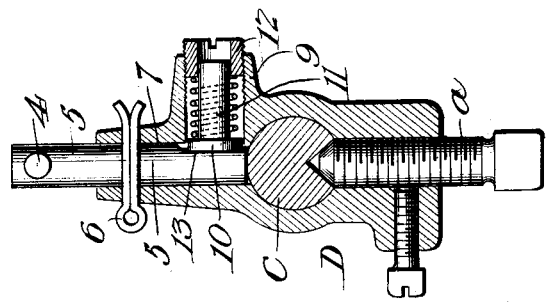
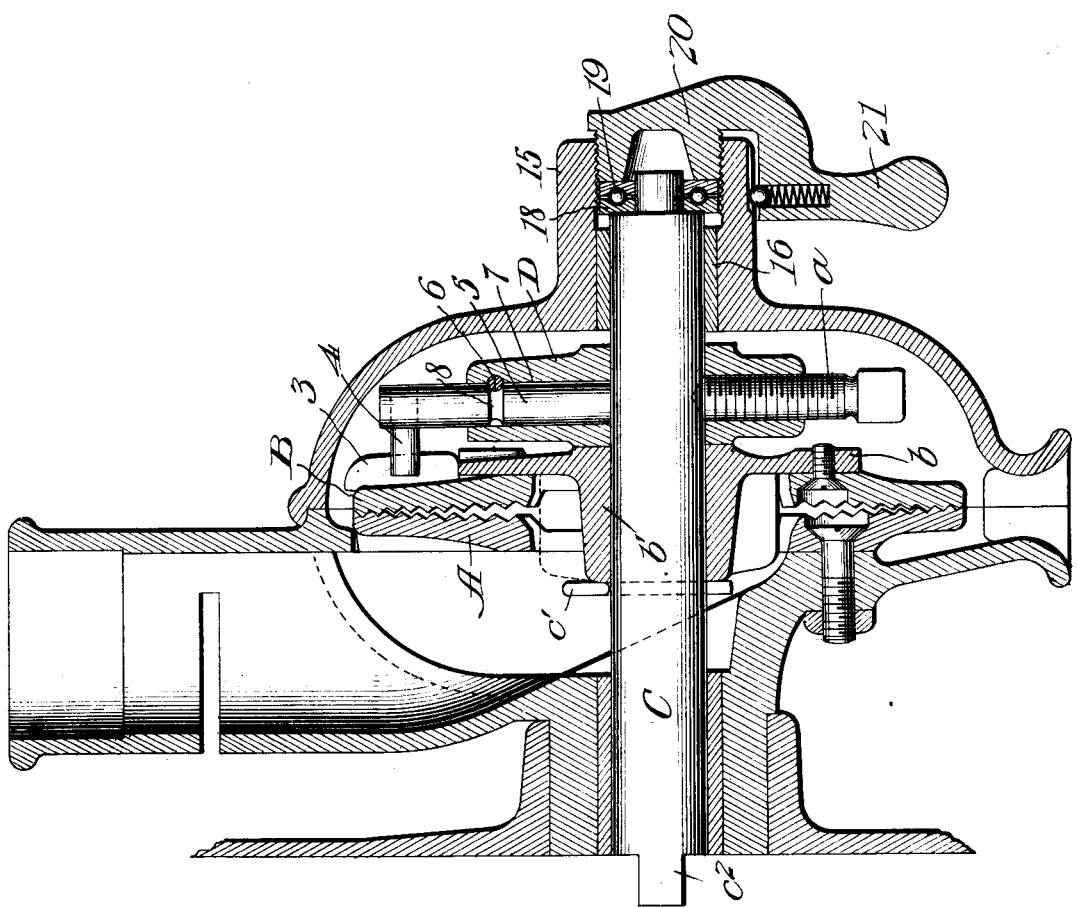
Witnesses
Inventor:
George Lane

UNITED STATES PATENT OFFICE.

GEORGE LANE, OF POUGHKEEPSIE, NEW YORK, ASSIGNOR TO LANE BROTHERS COMPANY, A CORPORATION OF NEW YORK.

YIELDING DRIVING CONNECTION.

1,063,808.     Specification of Letters Patent.     Patented June 3, 1913.

Application filed April 24, 1912. Serial No. 692,979.

*To all whom it may concern:*

Be it known that I, GEORGE LANE, citizen of the United States, residing at Poughkeepsie, New York, have invented certain new and useful Improvements in Yielding Driving Connection, of which the following is a specification.

My invention relates to grinding mills of that class generally used for grinding coffee and other substances, having like grinding qualities, and particularly first, to the mechanism for automatically disconnecting the driving mechanism from the rotary disk, in case a hard obstruction happens to enter the mill, and second, to means connected with the same driving shaft, for adjusting the grinding disks in relation to each other.

The object of my said invention is to simplify both devices and to increase their certainty and efficiency in action.

My said invention is illustrated in the accompanying drawings, in which—

Figure 1 is a vertical sectional view through a mill embodying my invention;
Fig. 2 is a sectional view through the driving means for the rotary disk, this section being taken transversely of the driving shaft.

In these drawings a mill is shown, for example, consisting of two grinding parts, a fixed disk A, and a rotary disk B. The disk A is fixed to the frame or casing of the mill. The rotary disk B is fixed by screws to the flange $b$ of a hub or collar $b'$ loosely mounted on the driving shaft C, between a cotter pin $c'$ and an arm D, which is fixed to the shaft by set screw $a$. On the rear face of the rotary grinding disk B there is a boss 3 set in the path of a driving dog carried by the arm D, whereby the disk B will be rotated when the dog, in the revolution of the shaft C, is in contact with the boss. This dog consists of a member 4 extending laterally from a shank portion or rock-shaft-part 5 which is adapted to turn in a socket 7 in the arm D, wherein it is held by a cotter pin 6 fitting in a groove 8 of the said shank.

On the arm D, and at right angles thereto, is a boss 9, bored to receive a head 10, the stem 11 of which extends into a hollow cap 12, threaded into the end of the boss 9. Around the stem is a spring arranged to bear upon the cap, and upon the head 10. This head is therefore pressed upon a flattened side of the shank 5, as shown at 13.
This gives a yielding hold upon the shank, sufficient to maintain the dog in normal position, and to cause the rotary disk to revolve in ordinary work. But when an obstruction, such as a screw, for example, gets into the mill, such obstruction will check the movement, and the dog will turn aside the flat face of the shank working against the head which yields, because it is backed by the spring. The dog remains out of range of the boss, and the shaft may then run freely without possibility of damage. The pressure of the head upon the shank may be adjusted by the screw.

The casing of the mill is made, as usual, removable or with a removable portion, so that the foreign body may be removed and the dog may be returned into operative position. The casing also carries the adjusting mechanism whereby the shaft of the mill which carries the dog, and the rotary disk, may be adjusted to vary the distance between the disks. A boss 15 on the casing, bored axially with the shaft, carries a brass bearing 16, for the shaft C, which is reduced and shouldered at its end, and bears on a thrust bearing comprising an antifriction two-part collar 18, containing an annular channel and antifriction rollers 19, on the end of which bears a hollow nut 20. This nut is threaded externally, and is screwed into the boss 15, being provided with an arm and handle 21, which has a spring stop arranged to engage in any one of the annular series of recesses or grooves in the periphery of the boss. This serves to hold the hollow screw movably, and thereby the shaft may be adjusted longitudinally and the space between the disks regulated, it being understood that the shaft C has a tongue $c^2$ to engage a notch in the end of a motor shaft, so that the longitudinal adjustment of the mill shaft can take place, as just stated. Between the motor shaft and the mill shaft a spring is arranged tending to push them apart, and keeping the opposite end of the mill shaft back against the thrust bearing. The cotter pin $c'$, which bears against the hub or collar $b'$ of the rotary grinding plate thus keeps this plate pushed back so that the disks will not rub together when the mill is running idle, that is, when coffee is not being ground.

I claim as my invention, substantially as described:—

1. In apparatus of the class described a rotary member to be driven, a shaft on which said member is loosely mounted, a driving dog engaging the rotary member, said dog having a rotatable shank, a yielding member bearing on the shank to hold it frictionally against turning, a carrier for the said shank and yielding member, said carrier consisting of an arm fitted to the exterior of the shaft and extending radially, with the dog at its outer end, and means for attaching the same at the desired point on the shaft, substantially as described.

2. In apparatus of the class described a rotary member to be driven, a shaft on which said rotary member is loosely mounted, a driving dog for the rotary member, said dog having a rotatable shank, a yielding member bearing on the shank to hold it against turning, a carrier for the said shank and yielding member consisting of an arm fitted to the exterior of the shaft, means for securing the arm to the shaft, and means for adjusting the tension of the yielding member also mounted on the carrier, substantially as described.

In testimony whereof, I affix my signature in presence of two witnesses.

GEORGE LANE.

Witnesses:
Wm. Couch,
F. Eugene Davis.